(12) United States Patent
Hiranaka (10) Patent No.: US 11,940,802 B2
(45) Date of Patent: Mar. 26, 2024

(54) SYSTEM FOR MANAGING WORK SITE AND METHOD FOR MANAGING WORK SITE

(71) Applicant: Komatsu Ltd., Tokyo (JP)

(72) Inventor: Takashi Hiranaka, Tokyo (JP)

(73) Assignee: Komatsu Ltd., Tokyo (JP)

( * ) Notice: Subject to any disclaimer, the term of this patent is extended or adjusted under 35 U.S.C. 154(b) by 352 days.

(21) Appl. No.: 17/603,436

(22) PCT Filed: May 26, 2020

(86) PCT No.: PCT/JP2020/020801
§ 371 (c)(1),
(2) Date: Oct. 13, 2021

(87) PCT Pub. No.: WO2020/246319
PCT Pub. Date: Dec. 10, 2020

(65) Prior Publication Data
US 2022/0187835 A1    Jun. 16, 2022

(30) Foreign Application Priority Data
Jun. 3, 2019   (JP) .................................. 2019-103975

(51) Int. Cl.
*G05D 1/02*    (2020.01)
*G05D 1/00*    (2006.01)

(52) U.S. Cl.
CPC ... *G05D 1/0214* (2013.01); *G05D 2201/0202* (2013.01)

(58) Field of Classification Search
CPC ......... G05D 1/0214; G05D 2201/0202; G05D 2201/021; G05D 1/0282; G08G 1/00
See application file for complete search history.

(56) References Cited

U.S. PATENT DOCUMENTS

| | | | |
|---|---|---|---|
| 6,226,572 B1 | 5/2001 | Tojima et al. | |
| 9,595,196 B1 | 3/2017 | Hiranaka | |
| 10,025,313 B2 | 7/2018 | Tojima et al. | |
| 2018/0182248 A1* | 6/2018 | Kanai | G08G 1/207 |

FOREIGN PATENT DOCUMENTS

| | | |
|---|---|---|
| JP | H10-222227 A | 8/1998 |
| JP | 2000-315112 A | 11/2000 |
| JP | 2016-153987 A | 8/2016 |
| JP | 2018-047813 A | 3/2018 |
| WO | 2015/015576 A1 | 2/2015 |
| WO | 2016/039489 A1 | 3/2016 |

* cited by examiner

*Primary Examiner* — Yuen Wong
(74) *Attorney, Agent, or Firm* — Locke Lord LLP (57) ABSTRACT

A system for managing a work site includes: an identification unit that identifies a discharging position of a manned vehicle in the work site where an unmanned vehicle and the manned vehicle operate in a mixed manner; and an operation control unit that controls operation of the unmanned vehicle based on the discharging position.

5 Claims, 6 Drawing Sheets

SYSTEM FOR MANAGING WORK SITE AND METHOD FOR MANAGING WORK SITE

FIELD

The present disclosure relates to a system for managing a work site and a method for managing the work site.

BACKGROUND

In a wide-area work site such as a mine, unmanned vehicles may operate.

CITATION LIST

Patent Literature

Patent Literature 1: JP 2016-153987 A

SUMMARY

Technical Problem

In a work site, manned vehicles may operate together with unmanned vehicles. When a manned vehicle is a transportation vehicle for transporting a cargo, the cargo of the manned vehicle may be discharged to any position by a driver of the manned vehicle. When the discharging position where the cargo is discharged from the manned vehicle and a course on which the unmanned vehicle is about to travel overlap with each other, the smooth operation of the unmanned vehicle is hindered.

Solution to Problem

According to an aspect of the present invention, a system for managing a work site, comprises: an identification unit that identifies a discharging position of a manned vehicle in the work site where an unmanned vehicle and the manned vehicle operate in a mixed manner; and an operation control unit that controls operation of the unmanned vehicle based on the discharging position.

Advantageous Effects of Invention

According to an aspect of the present invention, the unmanned vehicle can operate smoothly.

DESCRIPTION OF EMBODIMENTS

Although an embodiment of the disclosure will be described below with reference to the drawings, the invention is not limited to the embodiment. Components in the embodiment described below can be appropriately combined. Furthermore, some components are not used in some cases.

<Management System>

Figure 1:
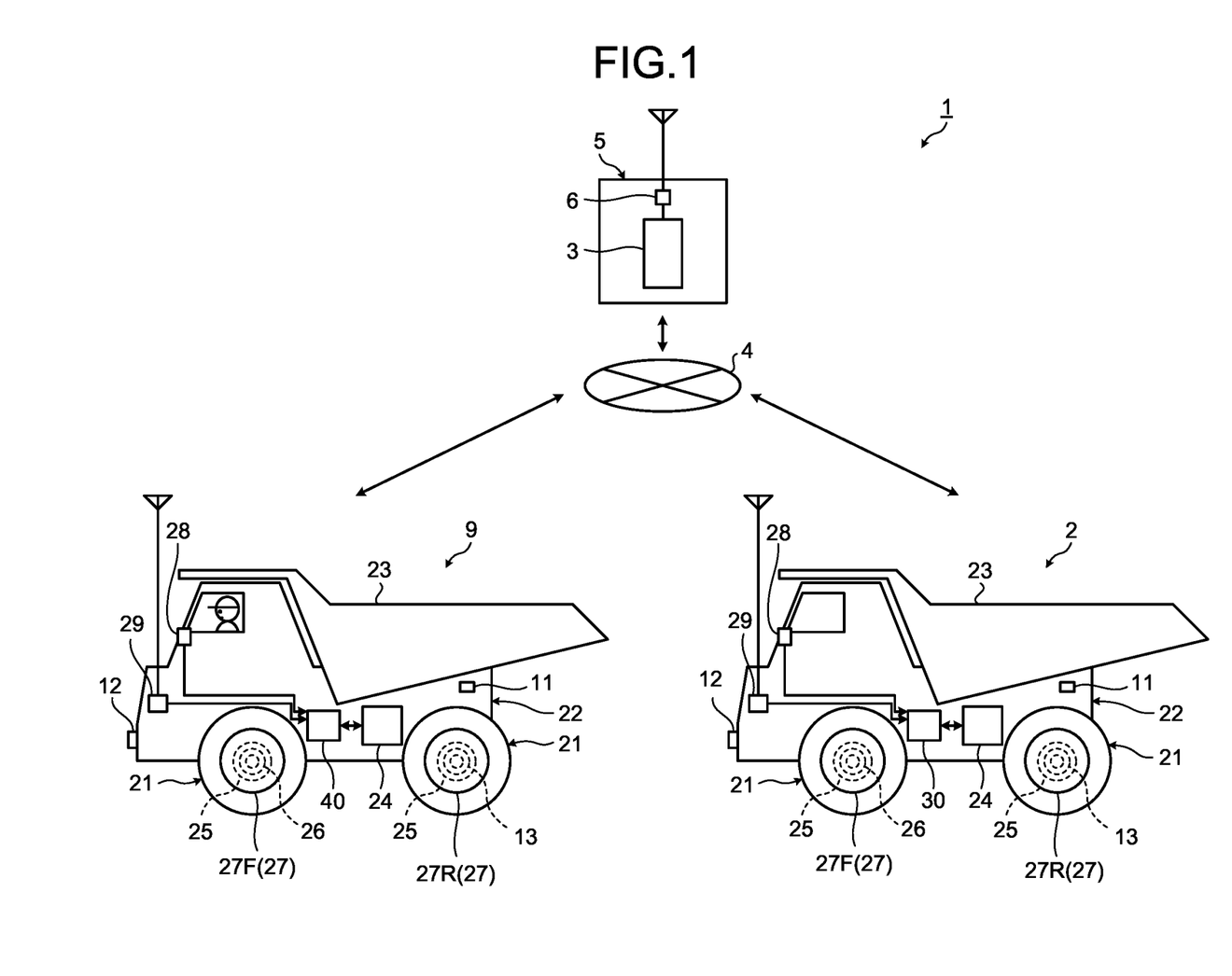
FIG. 1 schematically illustrates one example of a management system, an unmanned vehicle, and a manned vehicle according to an embodiment.

FIG. 1 schematically illustrates one example of a management system 1, an unmanned vehicle 2, and a manned vehicle 9 according to the embodiment. At a work site, the unmanned vehicle 2 and the manned vehicle 9 operate in a mixed manner. In the embodiment, the work site is a mine or a quarry. The mine refers to a place or business facilities for mining minerals.

The unmanned vehicle 2 refers to a vehicle that operates in an unmanned manner without depending on a driving operation of a driver. The manned vehicle 9 refers to a vehicle that operates by the driving operation of a driver.

The unmanned vehicle 2 and the manned vehicle 9 are dump trucks of a type of transportation vehicle that travels in a work site and transports a cargo. Examples of the cargo transported by the unmanned vehicle 2 and the manned vehicle 9 include ore and earth and sand excavated in the mine or the quarry.

The management system 1 includes a management device 3, a communication system 4, the unmanned vehicle 2, and the manned vehicle 9. The management device 3 includes a computer system, and is installed in, for example, a control facility 5 at a work site. The communication system 4 communicates between the management device 3, the unmanned vehicle 2, and the manned vehicle 9. A wireless communication device 6 is connected to the management device 3. The communication system 4 includes the wireless communication device 6. The management device 3, the unmanned vehicle 2, and the manned vehicle 9 wirelessly communicate with each other via the communication system 4.

<Unmanned Vehicle>

The unmanned vehicle 2 travels through a work site based on travel course data transmitted from the management device 3. The unmanned vehicle 2 includes a travel device 21, a vehicle body 22, a dump body 23, and a control device 30. The travel device 21 supports the vehicle body 22. The vehicle body 22 supports the dump body 23.

The travel device 21 includes a drive device 24, a brake device 25, a steering device 26, and wheels 27. The drive device 24 drives the travel device 21. The brake device 25 brakes the travel device 21. The steering device 26 adjusts a travel direction.

Rotation of the wheels 27 causes the unmanned vehicle 2 to be self-propelled. The wheels 27 include a front wheel 27F and a rear wheel 27R. Tires are mounted on the wheels 27.

The drive device 24 generates driving force for accelerating the unmanned vehicle 2. The drive device 24 includes an internal combustion engine such as a diesel engine. Note that the drive device 24 may include an electric motor. Power generated by the drive device 24 is transmitted to the rear wheel 27R. The brake device 25 generates braking force for decelerating or stopping the unmanned vehicle 2. The steering device 26 can adjust the travel direction of the unmanned vehicle 2. The travel direction of the unmanned vehicle 2 includes the direction of the front portion of the vehicle body 22. The steering device 26 adjusts the travel direction of the unmanned vehicle 2 by steering the front wheel 27F.

The dump body 23 is a member on which a cargo is loaded. The dump body 23 moves up and down by a driven hoist cylinder. Dump operation in which a cargo is discharged from the dump body 23 is executed by the moving up of the dump body 23.

The control device 30 can communicate with the management device 3 outside the unmanned vehicle 2. The control device 30 outputs an accelerator command, a brake command, and a steering command. The accelerator command is output for operating the drive device 24. The brake command is output for operating the brake device 25. The steering command is output for operating the steering device 26. The drive device 24 generates driving force for accelerating the unmanned vehicle 2 based on the accelerator command output from the control device 30. The travel speed of the unmanned vehicle 2 is adjusted by adjusting the output of the drive device 24. The brake device 25 generates braking force for decelerating the unmanned vehicle 2 based on the brake command output from the control device 30. The steering device 26 generates force for changing the direction of the front wheel 27F based on the steering command output from the control device 30 so that the unmanned vehicle 2 moves straight or turns.

Furthermore, the unmanned vehicle 2 includes a position sensor 28 that detects the position of the unmanned vehicle 2. The position of the unmanned vehicle 2 is detected by using a global navigation satellite system (GNSS). The global navigation satellite system includes a global positioning system (GPS). The global navigation satellite system detects the absolute position of the unmanned vehicle 2 specified by coordinate data of latitude, longitude, and altitude. The position of the unmanned vehicle 2 specified in a global coordinate system is detected by the global navigation satellite system. The global coordinate system refers to a coordinate system fixed to the earth. The position sensor 28 includes a GNSS receiver, and detects the absolute position (coordinates) of the unmanned vehicle 2.

Furthermore, the unmanned vehicle 2 includes a wireless communication device 29. The communication system 4 includes the wireless communication device 29. The wireless communication device 29 can wirelessly communicate with the management device 3.

Furthermore, the unmanned vehicle 2 includes a cargo sensor 11, an obstacle sensor 12, and a speed sensor 13.

The cargo sensor 11 detects the state of the dump body 23 on which a cargo is loaded. The cargo sensor 11 detects whether or not a cargo is loaded on the dump body 23. The cargo sensor 11 includes a weight sensor that detects the weight of the dump body 23. When it is determined that the weight of the dump body 23 is equal to or more than a specified value based on detection data of the weight sensor, it is determined that a cargo is loaded on the dump body 23. When it is determined that the weight of the dump body 23 is less than the specified value based on the detection data of the weight sensor, it is determined that a cargo is not loaded on the dump body 23. Note that the cargo sensor 11 may include a lifting sensor that detects the lifting state of the dump body 23. When it is determined that the dump body 23 moves down based on detection data of the lifting sensor, it is determined that a cargo is loaded on the dump body 23. When it is determined that the dump body 23 moves up based on detection data of the lifting sensor, it is determined that a cargo is not loaded on the dump body 23.

The obstacle sensor 12 detects an obstacle in front of the unmanned vehicle 2. The obstacle sensor 12 detects the obstacle in a non-contact manner. The obstacle sensor 12 detects relative positions of the unmanned vehicle 2 and the obstacle. A radar sensor capable of scanning an obstacle with radio waves and detecting relative positions of the unmanned vehicle 2 and the obstacle is exemplified as the obstacle sensor 12. Note that the obstacle sensor 12 includes a laser sensor capable of scanning an obstacle with laser light and detecting the relative positions of the unmanned vehicle 2 and the obstacle. One or a plurality of the obstacle sensors 12 may be provided in the unmanned vehicle 2. Furthermore, the obstacle sensor 12 that detects an obstacle behind the unmanned vehicle 2 is provided in the unmanned vehicle 2.

The speed sensor 13 detects the travel speed of the unmanned vehicle 2.

<Manned Vehicle>

The manned vehicle 9 travels through a work site based on the driving operation of a driver on board a cab of the manned vehicle 9. The manned vehicle 9 includes the travel device 21, the vehicle body 22, the dump body 23, the position sensor 28, the wireless communication device 29, the cargo sensor 11, the obstacle sensor 12, and a control device 40. The travel device 21 includes the drive device 24, the brake device 25, the steering device 26, and the wheels 27. The wheels 27 include the front wheel 27F and the rear wheel 27R.

The position sensor 28 of the manned vehicle 9 detects the position of the manned vehicle 9. The wireless communication device 29 of the manned vehicle 9 can wirelessly communicate with the management device 3.

The cargo sensor 11 of the manned vehicle 9 detects the state of the dump body 23 of the manned vehicle 9. The cargo sensor 11 of the manned vehicle 9 is similar to the cargo sensor 11 of the unmanned vehicle 2. That is, the cargo sensor 11 of the manned vehicle 9 detects whether or not a cargo is loaded on the dump body 23. For example, the cargo sensor 11 of the manned vehicle 9 may be a weight sensor that detects the weight of the dump body 23 or a lifting sensor that detects the lifting state of the dump body 23.

The obstacle sensor 12 of the manned vehicle 9 detects an obstacle in front of the manned vehicle 9. The obstacle sensor 12 of the manned vehicle 9 is similar to the obstacle sensor 12 of the unmanned vehicle 2. That is, the obstacle sensor 12 of the manned vehicle 9 detects an obstacle in a non-contact manner. The obstacle sensor 12 may be a radar sensor or a laser sensor. One or a plurality of obstacle sensors 12 may be provided in the manned vehicle 9. Furthermore, the obstacle sensor 12 that detects an obstacle behind the manned vehicle 9 is provided in the manned vehicle 9.

The speed sensor 13 of the manned vehicle 9 detects the travel speed of the manned vehicle 9.

The control device 40 can communicate with the management device 3 outside the manned vehicle 9. An accelerator pedal, a brake pedal, and a steering wheel are disposed in the cab. The accelerator pedal is used for operating the drive device 24. The brake pedal is used for operating the brake device 25. The steering wheel is used for operating the steering device 26. A driver operates the accelerator pedal, the brake pedal, and the steering wheel. The drive device 24 generates driving force for accelerating the manned vehicle 9 based on an accelerator pedal operation amount. The travel speed of the manned vehicle 9 is adjusted by adjusting the output of the drive device 24. The brake device 25 generates braking force for decelerating the manned vehicle 9 based on a brake pedal operation amount. The steering device 26 generates force for changing the direction of the front wheel 27F based on a steering wheel operation amount so that the manned vehicle 9 moves straight or turns.

<Work Site>

Figure 2:
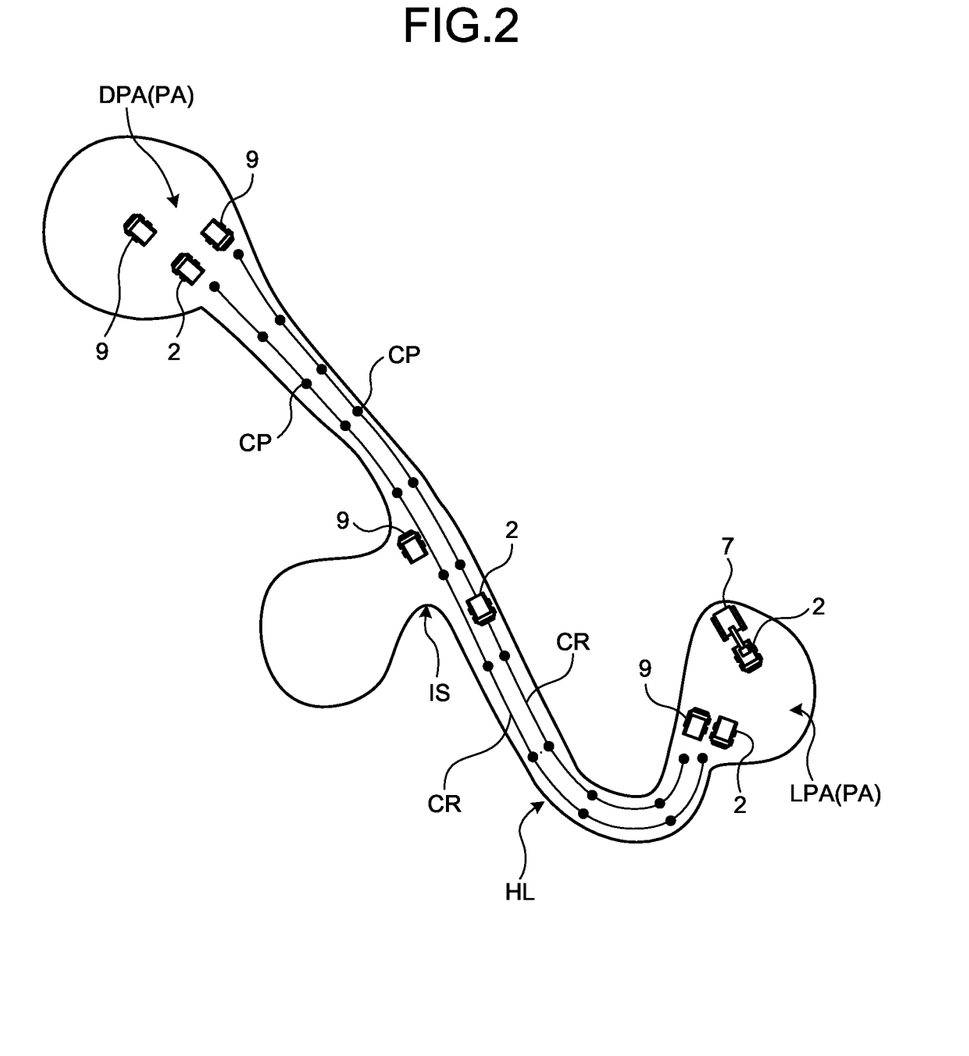
FIG. 2 schematically illustrates one example of a work site according to the embodiment.

FIG. 2 schematically illustrates one example of a work site according to the embodiment. The unmanned vehicle 2 and the manned vehicle 9 travel through at least a part of a workplace PA and a travel path HL leading to the workplace PA in a mine. The workplace PA includes at least one of a loading place LPA and a discharging place DPA. The travel path HL includes an intersection IS.

The loading place LPA refers to an area where loading operation for loading a cargo on the unmanned vehicle 2 and the manned vehicle 9 is performed. In the loading place LPA, a loader 7 operates. The loader 7 is a hydraulic shovel including working equipment. The discharging place DPA refers to an area where discharging operation for discharging a cargo from the unmanned vehicle 2 and the manned vehicle 9 is performed.

The unmanned vehicle 2 travels through a work site based on travel course data indicating a travel condition of the unmanned vehicle 2. As illustrated in FIG. 2, the travel course data includes a plurality of course points CP set at intervals. The course points CP specify target positions of the unmanned vehicle 2. A target travel speed and a target travel orientation of the unmanned vehicle 2 are set at each of the plurality of course points CP. Furthermore, the travel course data includes a travel course CR indicating a target travel route of the unmanned vehicle 2. The travel course CR is specified by a line connecting the plurality of course points CP.

The travel course CR is set in the travel path HL and the workplace PA. The unmanned vehicle 2 travels on the travel path HL along the travel course CR.

The travel course data is generated by the management device 3. The management device 3 transmits the generated travel course data to the control device 30 of the unmanned vehicle 2 via the communication system 4. The control device 30 controls the travel device 21 based on the travel course data so that the unmanned vehicle 2 travels along the travel course CR and travels in accordance with a target travel speed and a target travel orientation set in each of the plurality of course points CP.

In the embodiment, the unmanned vehicle 2 and the manned vehicle 9 operate in a mixed manner in the travel path HL and the workplace PA. For example, when a work site is shifted from a work site in which only the manned vehicle 9 operates as a transportation vehicle to a work site in which only the unmanned vehicle 2 operates, both the unmanned vehicle 2 and the manned vehicle 9 operate in the work site during a transition period.

<Management Device and Control Device>

Figure 3:
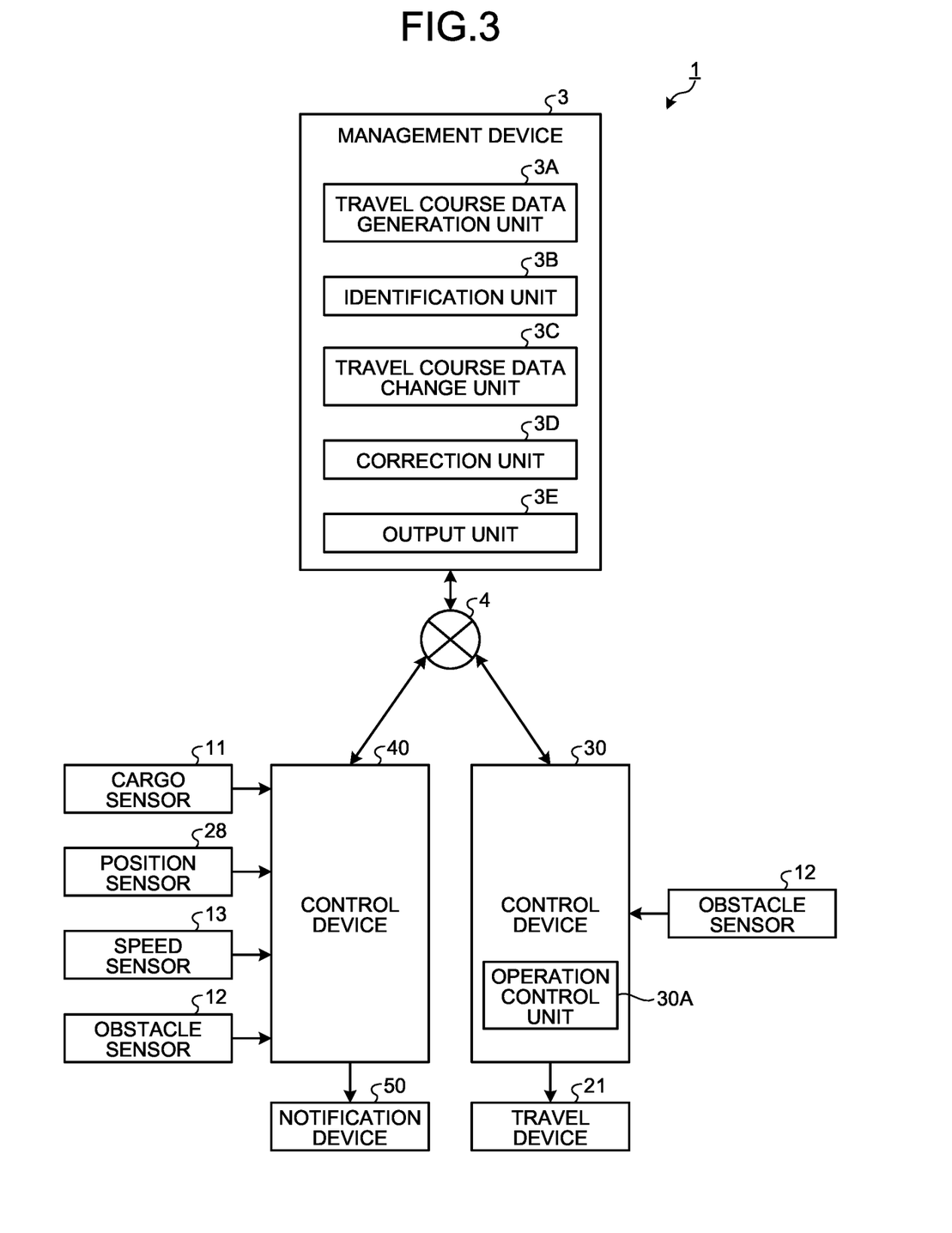
FIG. 3 is a functional block diagram illustrating one example of the management system according to the embodiment.

FIG. 3 is a functional block diagram illustrating one example of the management system 1 according to the embodiment. The management system 1 includes the management device 3, the control device 30, and the control device 40.

The management device 3 includes a travel course data generation unit 3A, an identification unit 3B, a travel course data change unit 3C, a correction unit 3D, and an output unit 3E.

The travel course data generation unit 3A generates travel course data of the unmanned vehicle 2. The travel course data generated by the travel course data generation unit 3A is output to the unmanned vehicle 2 via the output unit 3E.

The travel course data is transmitted from the output unit 3E to the control device 30 of the unmanned vehicle 2.

The identification unit 3B identifies a discharging position M of the manned vehicle 9 at the work site. The discharging position M refers to a position where a cargo is discharged from the manned vehicle 9 at the work site. In the present embodiment, the discharging position M is a concept including one or both of the position of a cargo discharged from the manned vehicle 9 and the position of the manned vehicle 9 at the time of discharging the cargo. Furthermore, the discharging position M may be a predetermined area including the position of the manned vehicle 9 at the time of discharging the cargo. The discharging position M may be, for example, a range of a circle having a radius of 5 m centered on the position of the manned vehicle 9 at the time of discharging the cargo.

The identification unit 3B identifies the discharging position M based on the detection data of the cargo sensor 11 of the manned vehicle 9 and the detection data of the position sensor 28 of the manned vehicle 9. The detection data of the cargo sensor 11 and the detection data of the position sensor 28 are transmitted to the management device 3 via the communication system 4.

Figure 4:
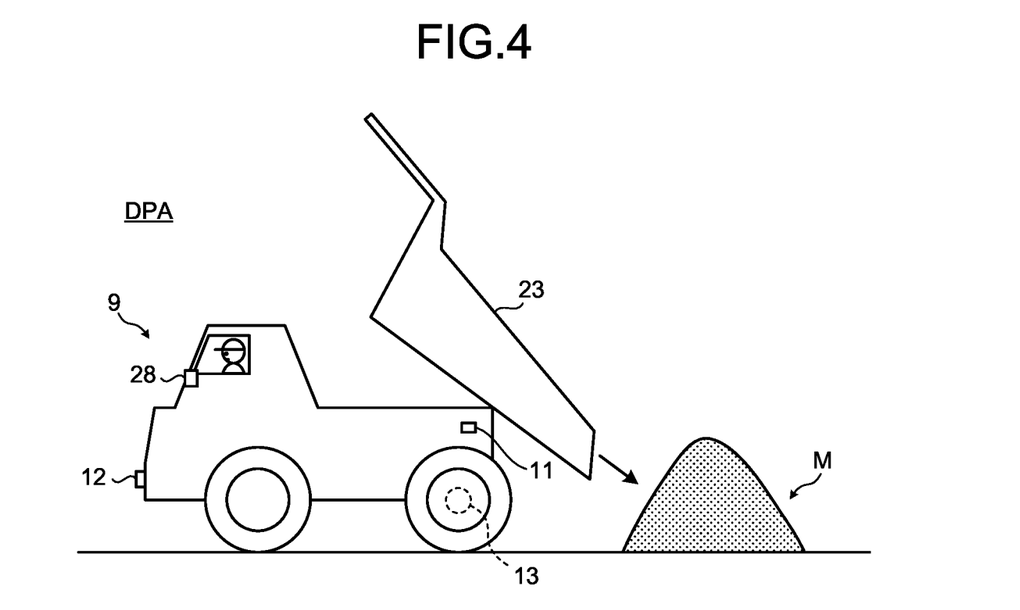
FIG. 4 illustrates a method of identifying a discharging position according to the embodiment.

FIG. 4 illustrates a method of identifying the discharging position M according to the embodiment. A driver of the manned vehicle 9 can discharge a cargo to any position of the discharging place DPA. When the cargo is discharged from the manned vehicle 9, the travel of the manned vehicle 9 is stopped. As illustrated in FIG. 4, the cargo is discharged to any position of the discharging place DPA by moving up the dump body 23 with the travel of the manned vehicle 9 being stopped. The position sensor 28 detects the position of the manned vehicle 9 at the time when the cargo is discharged from the manned vehicle 9. The cargo sensor 11 detects the fact that the cargo has been discharged from the dump body 23. Therefore, the identification unit 3B can identify the discharging position M of the manned vehicle 9 based on the detection data of the cargo sensor 11 of the manned vehicle 9 and the detection data of the position sensor 28 of the manned vehicle 9.

Note that, when a plurality of position sensors 28 is provided in the manned vehicle 9, the identification unit 3B can identify the orientation of the manned vehicle 9 at the time when the manned vehicle 9 discharges the cargo based on the detection data of each of the plurality of position sensors 28. Therefore, the identification unit 3B can identify the position of the cargo discharged from the manned vehicle 9 based on the position of the manned vehicle 9 at the time of discharging the cargo and the orientation of the manned vehicle 9.

Note that the identification unit 3B may identify the discharging position M based on the detection data of the cargo sensor 11 of the manned vehicle 9, the detection data of the position sensor 28 of the manned vehicle 9, and the detection data of the speed sensor 13. When the cargo is discharged from the manned vehicle 9, the travel of the manned vehicle 9 is stopped. Thus, the identification unit 3B can identify the discharging position M with high accuracy by considering not only the detection data of the cargo sensor 11 and the detection data of the position sensor 28 but the detection data of the speed sensor 13.

Furthermore, the identification unit 3B may identify the discharging position M based on the detection data of the position sensor 28 of the manned vehicle 9 and the detection data of the speed sensor 13. When the cargo is discharged from the manned vehicle 9 in the discharging place DPA, the manned vehicle 9 stops for a certain period of time. Thus, when it is determined that the manned vehicle 9 has left the discharging place DPA after stopping in the discharging place DPA for a certain period of time based on the detection data of the position sensor 28, the identification unit 3B may identify the position where the manned vehicle 9 has stopped for the certain period of time as the discharging position M.

Furthermore, when the position sensor 28 detects the orientation of the manned vehicle 9 and the detection data of the position sensor 28 includes the orientation of the manned vehicle 9, the identification unit 3B can identify the discharging position M with high accuracy by considering the orientation of the manned vehicle 9 in identification of the discharging position M.

The travel course data change unit 3C changes the travel course data of the unmanned vehicle 2 based on the discharging position M identified by the identification unit 3B.

Figure 5:
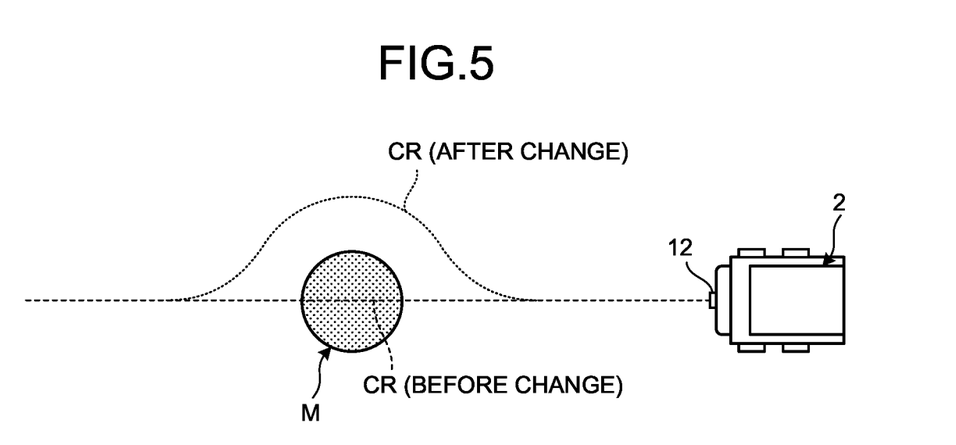
FIG. 5 illustrates a method of changing travel course data according to the embodiment.

FIG. 5 illustrates a method of changing travel course data according to the embodiment. The unmanned vehicle 2 travels in accordance with the travel course data. The travel course data includes the travel course CR. As illustrated in FIG. 5, the manned vehicle 9 may discharge a cargo onto the travel course CR. When the cargo is discharged onto the travel course CR, the travel course data change unit 3C changes the travel course CR so as to avoid the discharging position M based on the discharging position M identified by the identification unit 3B. This change inhibits the unmanned vehicle 2 from traveling toward the cargo discharged from the manned vehicle 9. The unmanned vehicle 2 can travel smoothly.

The correction unit 3D corrects the discharging position M identified by the identification unit 3B based on the detection data of the obstacle sensor 12 of the unmanned vehicle 2. The obstacle sensor 12 can detect relative positions of the unmanned vehicle 2 and a cargo at the discharging position M. Furthermore, the obstacle sensor 12 can detect the size of the cargo at the discharging position M. The position sensor 28 of the unmanned vehicle 2 detects the position of the unmanned vehicle 2. The correction unit 3D calculates the position of the cargo at the discharging position M based on the detection data of the position sensor 28 and the detection data of the obstacle sensor 12. The position of a cargo calculated based on the detection data of the position sensor 28 and the detection data of the obstacle sensor 12 is more highly likely to have high reliability than the discharging position M identified based on the detection data of the cargo sensor 11 of the manned vehicle 9 and the detection data of the position sensor 28 of the manned vehicle 9. Furthermore, the obstacle sensor 12 identifies the size of the cargo (range in which cargo exists) at the discharging position M. The reliability of the discharging position M is improved by correcting the discharging position M identified by the identification unit 3B based on the detection data of the obstacle sensor 12 of the unmanned vehicle 2.

Note that, the correction unit 3D may correct the discharging position M identified by the identification unit 3B based on the detection data of the obstacle sensor 12 of the manned vehicle 9.

The output unit 3E outputs the discharging position M identified by the identification unit 3B to the unmanned vehicle 2. When the travel course data change unit 3C changes the travel course data, the output unit 3E outputs the travel course data that has been changed by the travel course data change unit 3C to the unmanned vehicle 2. When the correction unit 3D corrects the discharging position M, the output unit 3E outputs the discharging position M corrected by the correction unit 3D to the unmanned vehicle 2.

The control device 30 includes an operation control unit 30A that controls the operation of the unmanned vehicle 2. The operation control unit 30A acquires the travel course data output from the output unit 3E, and controls the travel of the unmanned vehicle 2. The operation control unit 30A controls the travel device 21 of the unmanned vehicle 2 so that the unmanned vehicle 2 travels in accordance with the travel course data. Furthermore, the operation control unit 30A controls the operation of the unmanned vehicle 2 based on the discharging position M of the manned vehicle 9. As described with reference to FIG. 4, when the travel course data is changed based on the discharging position M, the operation control unit 30A controls the travel device 21 of the unmanned vehicle 2 so that the unmanned vehicle 2 travels based on the travel course data after being changed by the travel course data change unit 3C. Furthermore, when the correction unit 3D corrects the discharging position M, the operation control unit 30A controls the operation of the unmanned vehicle 2 based on the discharging position M corrected by the correction unit 3D.

<Management Method>

Figure 6:
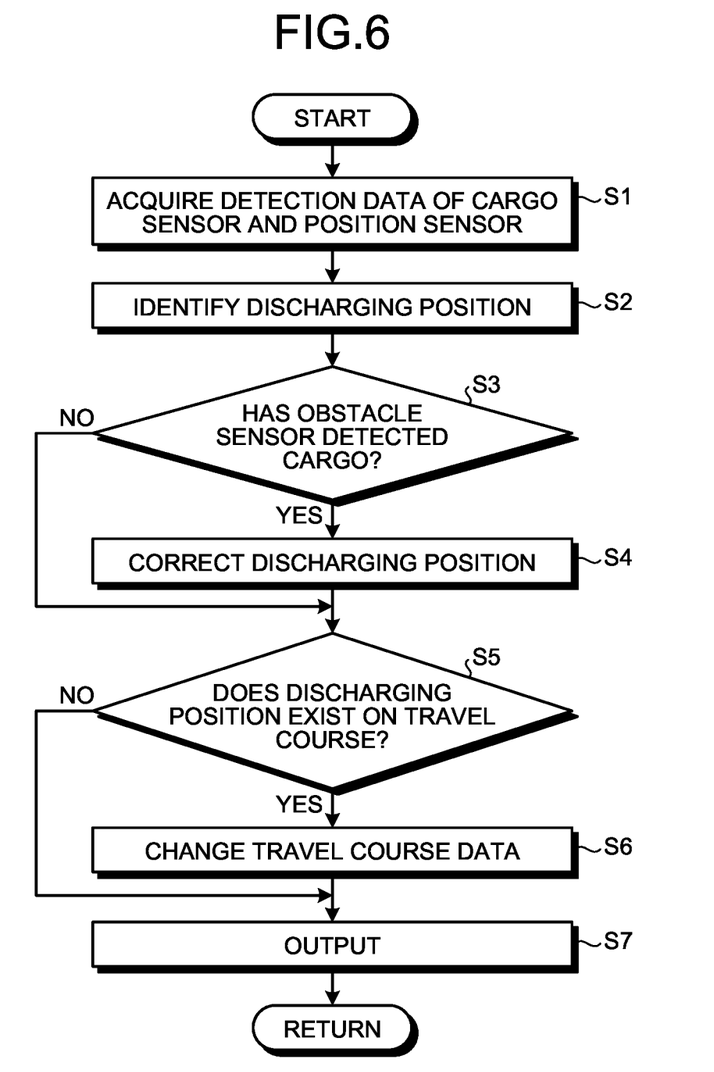
FIG. 6 is a flowchart illustrating one example of a management method according to the embodiment.

FIG. 6 is a flowchart illustrating one example of a management method according to the embodiment. The identification unit 3B acquires detection data of the cargo sensor 11 of the manned vehicle 9 and detection data of the position sensor 28 of the manned vehicle 9 (Step S1).

The identification unit 3B identifies the discharging position M based on the detection data of the cargo sensor 11 and the detection data of the position sensor 28 (Step S2).

The correction unit 3D acquires detection data of the obstacle sensor 12 of the unmanned vehicle 2 or the manned vehicle 9. The correction unit 3D determines whether or not the obstacle sensor 12 has detected a cargo discharged from the manned vehicle 9 (Step S3).

In Step S3, when it is determined that the obstacle sensor 12 has detected the cargo discharged from the manned vehicle 9 (Step S3: Yes), the correction unit 3D corrects the discharging position M identified in Step S2 based on the detection data of the obstacle sensor 12 (Step S4).

In Step S3, when it is determined that the obstacle sensor 12 has not detected the cargo discharged from the manned vehicle 9 (Step S3: No), the correction unit 3D does not correct the discharging position M.

The travel course data change unit 3C determines whether or not the discharging position M derived in Step S2 or S4 exists on the travel course CR (Step S5).

When it is determined in Step S5 that the discharging position M exists on the travel course CR (Step S5: Yes), the travel course data change unit 3C changes the travel course data so as to avoid the discharging position M based on the discharging position M (Step S6).

When it is determined in Step S5 that the discharging position M does not exist on the travel course CR (Step S5: No), the travel course data change unit 3C does not change the travel course data.

When the travel course data is changed in Step S5, the output unit 3E outputs the travel course data that has been changed by the travel course data change unit 3C to the unmanned vehicle 2. When the travel course data is not changed in Step S5, the output unit 3E outputs the travel course data that has been generated by the travel course data generation unit 3A to the unmanned vehicle 2 (Step S7).

The operation control unit 30A of the unmanned vehicle 2 controls the operation of the unmanned vehicle 2 based on the travel course data output from the output unit 3E.

<Computer System>

Figure 7:
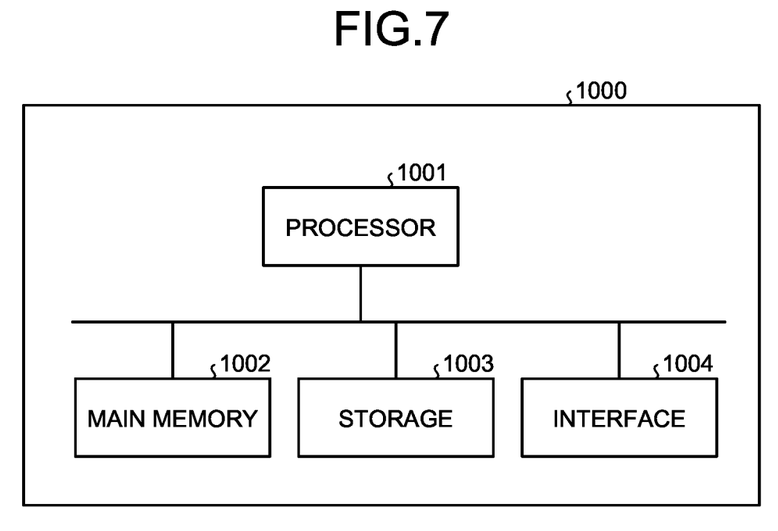
FIG. 7 is a block diagram illustrating one example of a computer system according to the embodiment.

FIG. 7 is a block diagram illustrating one example of a computer system 1000. Each of the management device 3, the control device 30, and the control device 40 described above includes the computer system 1000. The computer system 1000 includes a processor 1001 such as a central processing unit (CPU), a main memory 1002, a storage 1003, and an interface 1004. The main memory 1002 includes a nonvolatile memory such as a read only memory (ROM) and a volatile memory such as a random access memory (RAM). The interface 1004 includes an input/output circuit. Each of the functions of the above-described management device 3, the control device 30, and the control device 40 is stored in the storage 1003 as a program. The processor 1001 reads the program from the storage 1003, develops the program in the main memory 1002, and executes the above-described processing in accordance with the program. Note that the program may be distributed to the computer system 1000 via a network.

A computer system 1000 can execute identifying a discharging position M of a manned vehicle 9 in the work site where an unmanned vehicle 2 and the manned vehicle 9 operate in a mixed manner; and controlling operation of the unmanned vehicle 2 based on the discharging position M in accordance with the above-described embodiment.

<Effects>

As described above, according to the embodiment, the identification unit 3B identifies the discharging position M at which the manned vehicle 9 has discharged a cargo in a work site where the unmanned vehicle 2 and the manned vehicle 9 operate in a mixed manner. As a result, the travel of the unmanned vehicle 2 is controlled so that the unmanned vehicle 2 does not travel toward the discharging position M based on the identified discharging position M. Since the unmanned vehicle 2 can travel while avoiding the discharging position M, the unmanned vehicle 2 can operate smoothly.

OTHER EMBODIMENTS

In the above-described embodiment, the travel course data is changed based on the discharging position M. The travel course data is not required to be changed based on the discharging position M. The discharging position M is output from the output unit 3E to the unmanned vehicle 2. The control device 30 of the unmanned vehicle 2 can thereby control the travel of the unmanned vehicle 2 so as to avoid the discharging position M.

In the above-described embodiment, the travel course data is changed based on the discharging position M. The discharging position and the travel course data of the unmanned vehicle 2 may be changed based on the discharging position M of the manned vehicle 9. For example, the manned vehicle 9 may discharge a cargo first to the discharging position where a cargo is scheduled to be discharged by the unmanned vehicle 2. When the manned vehicle 9 discharges a cargo first to the discharging position where a cargo is scheduled to be discharged by the unmanned vehicle 2, the travel course data change unit 3C changes the discharging position and the travel course data of the unmanned vehicle 2 based on the discharging position M of the manned vehicle 9. Note that, for example, an administrator of the control facility 5 may change the discharging position and the travel course data of the unmanned vehicle 2. The operation control unit 30A controls the operation of the unmanned vehicle 2 based on the changed discharging position and travel course data of the unmanned vehicle 2. The operation control unit 30A causes the unmanned vehicle 2 to travel toward the changed discharging position of the unmanned vehicle 2.

In the above-described embodiment, the identification unit 3B identifies the discharging position M by using the detection data of the obstacle sensor 12 that detects an obstacle in front of the unmanned vehicle 2 or the manned vehicle 9. As described above, the unmanned vehicle 2 and the manned vehicle 9 include the obstacle sensor 12 that detects a rear obstacle. The identification unit 3B may identify the discharging position M by using the detection data of the obstacle sensor 12 that detects an obstacle behind the unmanned vehicle 2 or the manned vehicle 9. For example, when the unmanned vehicle 2 or the manned vehicle 9 moves backward and the obstacle sensor 12 detects an obstacle behind the unmanned vehicle 2 or the manned vehicle 9, the identification unit 3B can identify the discharging position M by using the detection data of the obstacle sensor 12 that detects an obstacle behind the unmanned vehicle 2 or the manned vehicle 9.

In the above-described embodiment, the discharging position M is identified based on the detection data related to the manned vehicle 9 (Step S2), the discharging position M is corrected based on the detection data of the obstacle sensor 12 of the unmanned vehicle 2 (Step S4), and the travel course data of the unmanned vehicle 2 is changed based on the corrected discharging position M (Step S6). The processing of Step S2 may be omitted. That is, after the discharging position M is identified by the unmanned vehicle 2 (Step S4), the travel course data of the unmanned vehicle 2 may be changed (Step S6) based on the identified discharging position M. In this case, the relative positions of the unmanned vehicle 2 and the discharging position M of the manned vehicle 9 are detected by the obstacle sensor 12 of the unmanned vehicle 2, and the discharging position M is identified.

Furthermore, in the above-described embodiment, the processing of Step S4 may be omitted. That is, after the discharging position M is identified by the manned vehicle 9 (Step S2), the travel course data of the unmanned vehicle 2 may be changed (Step S6) based on the identified discharging position M.

In the above-described embodiment, an entry prohibited area in which entry of the unmanned vehicle 2 is prohibited may be set based on the discharging position M. Travel of the unmanned vehicle 2 to the discharging position M is inhibited by setting the entry prohibited area including the discharging position M.

In the above-described embodiment, the manned vehicle 9 discharges a cargo in the discharging place DPA, and the identification unit 3B identifies the discharging position M in the discharging place DPA. The discharging position M is not limited to the discharging place DPA. For example, the manned vehicle 9 may discharge the cargo in the vicinity of the travel path HL. The identification unit 3B can identify the discharging position M on the travel path HL. Furthermore, the manned vehicle 9 is likely to discharge a cargo to the loading place LPA or discharge the cargo to an intersection. The identification unit 3B can identify the discharging position M in the loading place LPA and the discharging position M at the intersection. That is, the identification unit 3B can identify the discharging position M in a work site such as a mine.

In the above-described embodiment, at least a part of the function of the control device 30 and the function of the control device 40 may be provided in the management device 3, or at least a part of the function of the management device 3 may be provided in the control device 30 and the control device 40. For example, the function of the identification unit 3B may be provided in the control device 40 of the manned vehicle 9 or the control device 30 of the unmanned vehicle 2.

Note that, in the above-described embodiment, the travel course data is generated in the management device 3, and the unmanned vehicle 2 travels in accordance with the travel course data transmitted from the management device 3. The control device 30 of the unmanned vehicle 2 may generate the travel course data. That is, the control device 30 may include the travel course data generation unit 3A. Furthermore, each of the management device 3 and the control device 30 may include the travel course data generation unit 3A.

For example, the unmanned vehicle 2 may identify the discharging position M of the manned vehicle 9 without acquiring the travel course data from the management device 3, and travel based on the identified discharging position M.

Note that, in the above-described embodiment, the unmanned vehicle 2 and the manned vehicle 9 are dump trucks of a type of transportation vehicle. The unmanned vehicle 2 and the manned vehicle 9 may be a work machine including working equipment such as a hydraulic shovel and a bulldozer.

REFERENCE SIGNS LIST

1 MANAGEMENT SYSTEM
2 UNMANNED VEHICLE
3 MANAGEMENT DEVICE
3A TRAVEL COURSE DATA GENERATION UNIT
3B IDENTIFICATION UNIT
3C TRAVEL COURSE DATA CHANGE UNIT
3D CORRECTION UNIT
3E OUTPUT UNIT
4 COMMUNICATION SYSTEM
5 CONTROL FACILITY
6 WIRELESS COMMUNICATION DEVICE
7 LOADER
9 MANNED VEHICLE
11 CARGO SENSOR
12 OBSTACLE SENSOR
13 SPEED SENSOR
21 TRAVEL DEVICE
22 VEHICLE BODY
23 DUMP BODY
24 DRIVE DEVICE
25 BRAKE DEVICE
26 STEERING DEVICE
27 WHEEL
27F FRONT WHEEL
27R REAR WHEEL
28 POSITION SENSOR
29 WIRELESS COMMUNICATION DEVICE
30 CONTROL DEVICE
30A OPERATION CONTROL UNIT
40 CONTROL DEVICE
CP COURSE POINT
CR TRAVEL COURSE
PA WORKPLACE
DPA DISCHARGING PLACE
M DISCHARGING POSITION
HL TRAVEL PATH

The invention claimed is:

1. A system for managing a work site, comprising:
a computer system including a processor configured to:
identify a discharging position of a cargo of a manned vehicle in the work site where an unmanned vehicle and the manned vehicle operate in a mixed manner, the discharging position including one or both of a position of the cargo discharged from the manned vehicle and a position of the manned vehicle at a time of discharging the cargo, or a predetermined area including the position of the manned vehicle at the time of discharging the cargo; and
control operation of the unmanned vehicle based on the discharging position.

2. The system for managing a work site according to claim 1, wherein the computer system is configured to:
generate travel course data of the unmanned vehicle; and
change the travel course data based on the discharging position,
wherein the unmanned vehicle travels based on the travel course data that has been changed by the computer system.

3. The system for managing a work site according to claim 1,
wherein the manned vehicle includes a position sensor that detects a position of the manned vehicle, and
the computer system identifies the discharging position based on detection data of the position sensor.

4. The system for managing a work site according to claim 1, wherein the computer system is configured to:
correct the discharging position based on detection data of an obstacle sensor of the unmanned vehicle or the manned vehicle,
wherein the computer system controls the operation of the unmanned vehicle based on the discharging position that has been corrected by the computer system.

5. A method for managing a work site, comprising:
identifying a discharging position of a cargo of a manned vehicle in the work site where an unmanned vehicle and the manned vehicle operate in a mixed manner, the discharging position including one or both of a position of the cargo discharged from the manned vehicle and a position of the manned vehicle at a time of discharging the cargo, or a predetermined area including the position of the manned vehicle at the time of discharging the cargo; and
controlling operation of the unmanned vehicle based on the discharging position.

* * * * *